United States Patent
Gilbert-Eyres et al.

(10) Patent No.: US 10,507,799 B1
(45) Date of Patent: Dec. 17, 2019

(54) VEHICLE LOCATION TRACKING

(71) Applicant: GM GLOBAL TECHNOLOGY OPERATIONS LLC, Detroit, MI (US)

(72) Inventors: Matthew E. Gilbert-Eyres, Rochester, MI (US); Russell A. Patenaude, Macomb Township, MI (US); Eric T. Hosey, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/214,957

(22) Filed: Dec. 10, 2018

(51) Int. Cl.
*B60R 25/33* (2013.01)
*G01C 21/14* (2006.01)
*B60R 25/40* (2013.01)
*B60R 25/32* (2013.01)

(52) U.S. Cl.
CPC .............. *B60R 25/33* (2013.01); *B60R 25/32* (2013.01); *B60R 25/40* (2013.01); *G01C 21/14* (2013.01)

(58) Field of Classification Search
CPC ......... B60R 25/33; B60R 25/32; B60R 25/40; G01C 21/14
See application file for complete search history.

(56) References Cited

U.S. PATENT DOCUMENTS

2006/0038664 A1* 2/2006 Park .................... B60R 25/1004 340/426.19

* cited by examiner

*Primary Examiner* — Curtis B Odom
(74) *Attorney, Agent, or Firm* — Reising Ethington P.C.; David Willoughby (57) ABSTRACT

A system and method of tracking a location of a vehicle while the vehicle is in a primary propulsion off state. The method includes: obtaining an initial vehicle location of the vehicle; detecting a vehicle trigger condition while the vehicle is in the primary propulsion off state; determining whether the vehicle has moved more than a first predetermined threshold distance from the initial vehicle location while the vehicle is in the primary propulsion off state; determining a vehicle activity factor and a vehicle location classification factor; and when it is determined that the vehicle has moved more than the first predetermined threshold distance from the initial vehicle location, carrying out a vehicle location tracking process while the vehicle is in the primary propulsion off state based on the vehicle activity factor and the vehicle location classification factor.

20 Claims, 4 Drawing Sheets

VEHICLE LOCATION TRACKING

INTRODUCTION

The present invention relates to vehicle location tracking and managing vehicle power consumption.

Vehicles include hardware and software capable of obtaining and processing various information, including information that is obtained by vehicle system modules (VSMs). Moreover, vehicles include networking capabilities and can be connected to a vehicle backend server for purposes of vehicle location tracking. The vehicle can use a battery to power certain VSMs even when the vehicle is in a primary propulsion off state, such as when the vehicle ignition is off. Thus, it is desirable to manage usage of electrical power of the battery when the vehicle is in a primary propulsion off state.

SUMMARY

According to one aspect of the invention, there is provided a method of tracking a location of a vehicle while the vehicle is in a primary propulsion off state. The method includes: obtaining an initial vehicle location of the vehicle, wherein the initial vehicle location is associated with a time in which the vehicle transitions from a primary propulsion on state to a primary propulsion off state; detecting a vehicle trigger condition while the vehicle is in the primary propulsion off state; determining whether the vehicle has moved more than a first predetermined threshold distance from the initial vehicle location while the vehicle is in the primary propulsion off state; determining a vehicle activity factor and a vehicle location classification factor; and when it is determined that the vehicle has moved more than the first predetermined threshold distance from the initial vehicle location, carrying out a vehicle location tracking process while the vehicle is in the primary propulsion off state based on the vehicle activity factor and the vehicle location classification factor.

According to various embodiments, this method may further include any one of the following features or any technically-feasible combination of some or all of these features:

- the vehicle trigger condition is a theft trigger condition, wherein the theft trigger condition is a condition that indicates the vehicle is being stolen, broken into, and/or tampered with;
- in response to detecting the vehicle trigger condition, monitoring the vehicle location until it is determined that the vehicle has moved more than the first predetermined threshold distance from the initial vehicle location, at which time the vehicle location tracking process is carried out;
- determining one or more vehicle location tracking process parameters, wherein the vehicle location tracking process is carried out based on the one or more vehicle location tracking process parameters;
- the one or more vehicle location tracking process parameters include a vehicle location determination rate and/or a vehicle location reporting rate;
- the vehicle activity factor represents a rate of movement of the vehicle based on two or more vehicle locations, each of which is associated with a time indicator;
- the one or more vehicle location tracking process parameters are based on the vehicle activity factor and the vehicle location classification factor;
- the one or more vehicle location tracking process parameters include a predetermined waiting time, and wherein the vehicle location tracking process pauses or waits for the predetermined waiting time between iterations;
- the method is carried out by a telematics unit of the vehicle, and wherein the telematics unit is woken up as a part of each iteration of the vehicle location tracking process;
- the vehicle location tracking process includes periodically determining and reporting an updated vehicle location to a remote server;
- initiating a connection between the vehicle and a remote server using the telematics unit, and wherein the updated vehicle location is periodically reported to the remote server; and/or
- the updated vehicle location is periodically reported to the remote server according to a vehicle location reporting rate, and wherein the vehicle location reporting rate is determined based on the vehicle activity factor and the vehicle location classification factor.

According to another aspect of the invention, there is provided a method of tracking a location of a vehicle while the vehicle is in a primary propulsion off state. The method includes: detecting a vehicle trigger condition while the vehicle is in the primary propulsion off state; determining one or more vehicle location tracking process parameters based on one or more vehicle location tracking process factors; and carrying out a vehicle location tracking process based on the one or more vehicle location tracking process parameters, wherein the vehicle location tracking process is carried out while the vehicle is in the primary propulsion off state, and wherein the vehicle location tracking process includes: (i) waking up a telematics unit of the vehicle; (ii) after waking up the telematics unit, establishing a remote connection with a remote server using the telematics unit; (iii) determining an updated vehicle location; (iv) reporting the updated vehicle location using the connection; and (v) repeating the vehicle location tracking process according to a vehicle location iteration interval, wherein the vehicle location iteration interval is based at least on one of the vehicle location tracking process parameters.

According to various embodiments, this method may further include any one of the following features or any technically-feasible combination of some or all of these features:

- the vehicle location iteration interval represents a predetermined wait time in which the vehicle location tracking process waits until carrying out a next iteration;
- the telematics unit includes a global navigation satellite system (GNSS) receiver, and wherein the GNSS receiver is used to determine the updated vehicle location;
- the one or more vehicle location tracking process factors are monitored during the carrying out of the vehicle location tracking process, and wherein the method further includes the step of, when it is determined that the one or more vehicle location tracking process parameters have changed, selecting a new vehicle location tracking process or carrying out the vehicle location tracking process using updated vehicle location tracking process parameters;
- the one or more vehicle location tracking process factors include a vehicle activity factor, a vehicle location classification factor, and a traffic factor;
- obtaining an initial vehicle location, wherein the initial vehicle location is associated with a time in which the vehicle transitions from a primary propulsion on state to the primary propulsion off state;

determining whether the vehicle has moved more than a first predetermined threshold distance from the initial vehicle location while the vehicle is in the primary propulsion off state and, when it is determined that the vehicle has moved more than a first predetermined threshold distance from the initial vehicle location, carrying out the vehicle location tracking process; and/or the vehicle location tracking process further includes detecting a predetermined vehicle operating condition based on receiving onboard sensor information, and, in response to detecting the predetermined vehicle operating condition, determining the updated vehicle location and/or reporting the updated vehicle location.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables tracking of a vehicle's location while the vehicle is in a primary propulsion off state. The system and method provided herein allows the vehicle to select parameters for use in a vehicle location tracking process based on various factors, such as the amount of movement of the vehicle ("vehicle activity factor"), amount of nearby traffic ("traffic factor"), type of area (e.g., city, rural) ("vehicle location classification factor"), and/or vehicle operating conditions. For example, when the vehicle is located in a city and is experiencing high-activity, the location of the vehicle can be determined and/or reported at a high frequency compared to when the vehicle is located in a rural area and is experiencing low-activity. Through changing the rate at which the location is determined and/or reported to a remote facility, the vehicle location tracking process can be adapted so that the remaining battery of the vehicle is effectively used. Moreover, cellular communications used by a telematics unit of the vehicle can be effectively used as well to thereby provide extra vehicle location monitoring time.

Figure 1:
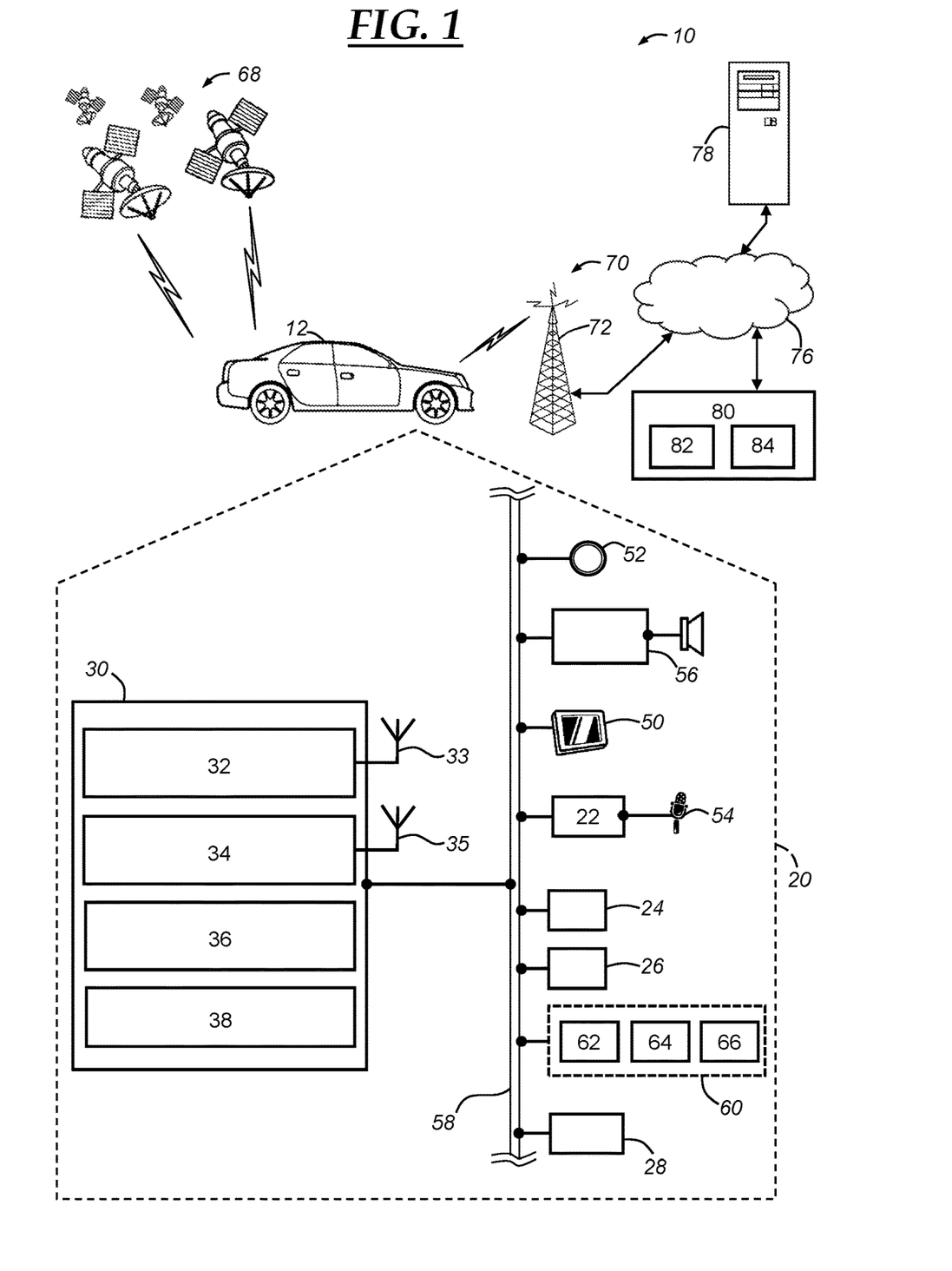
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a telematics unit 30 and other VSMs 22-66, a constellation of global navigation satellite system (GNSS) satellites 68, one or more wireless carrier systems 70, a land communications network 76, a remote computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services and/or geographical roadway map data to a plurality of vehicles and other electronic network computing devices, including vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend services facility 80 is a remote facility and is located at a physical location that is located remotely from vehicle 12. The vehicle backend services facility 80 (or "backend facility 80" for short) may be designed to provide the vehicle electronics 20 with a number of different system back-end functions through use of one or more electronic servers 82 and, in many cases, may provide navigation-related services to a plurality of vehicles. In one embodiment, the backend facility 80 provides vehicle location monitoring services and/or vehicle theft monitoring services. The vehicle backend services facility 80 includes vehicle backend services servers 82 and databases 84, which may be stored on a plurality of memory devices. Vehicle backend services facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous backend facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services, such as the carrying out of one or more method steps as discussed below. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. One or more databases at the backend facility 80 can store various information and can include vehicle location monitoring information, which can include locations (e.g., geographical locations) of various vehicles at different times so as to track and/or monitor the location of such vehicles.

Vehicle 12 is depicted in the illustrated embodiment as a passenger car, but it should be appreciated that any other vehicle including motorcycles, trucks, sports utility vehicles (SUVs), recreational vehicles (RVs), unmanned aerial vehicles (UAVs) (e.g., drones), marine vessels, aircraft, etc., can also be used. Some of the vehicle electronics 20 are shown generally in FIG. 1 and includes an infotainment module 22, a body control module or unit (BCM) 24, other vehicle system modules (VSMs) 28, a telematics unit 30 (that includes a global navigation satellite system (GNSS) receiver 34), vehicle-user interfaces 50-56, and battery system 60. In the illustrated embodiment, the vehicle 12 is an internal combustion engine (ICE) vehicle that includes an electric battery 62 that provides electrical power to various components of the vehicle electronics 20. In other embodiments, however, the vehicle 12 can be an electric vehicle (EV) that primarily uses a battery for propulsion, such as a battery electric vehicle (BEV). And, in some embodiments, the vehicle 12 can be a hybrid (e.g., a plug-in hybrid electric vehicle (PHEV)). Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the infotainment module 22, the BCM 24, the telematics unit 30, the GNSS receiver 34, vehicle-user interfaces 50-56, and battery system 60, which will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the telematics unit 30. One or more VSMs 28 may periodically or occasionally have their software or firmware updated and, in some embodiments, such vehicle updates may be over the air (OTA) updates that are received from a computer 78 or backend facility 80 via land network 76 and telematics unit 30. As is appreciated by those skilled in the art, the above-mentioned VSMs are only examples of some of the modules that may be used in vehicle 12, as numerous others are also possible.

The infotainment module 22 is an in-vehicle infotainment unit (IVI) or an in-car entertainment (ICE) module that can provide various functionality to a vehicle user. For example, the infotainment module 22 can enable the vehicle user to control various aspects of the vehicle, including entertainment functionality (e.g., radio, CD players, streaming services), wireless connectivity (e.g., Wi-Fi™, Bluetooth™), heating/ventilation/air conditioning (HVAC) functionality, and/or other vehicle settings. The infotainment module 22 can include a short-range wireless communications (SRWC) circuit that enables the vehicle electronics 20 to connect to other SRWC devices, such as a handheld wireless device (HWD) (e.g., a smartphone). The infotainment module 22 can include a processor and/or memory, and can be programmed to carry out various computer instructions. The infotainment module 22 is depicted as a separate VSM, but in other embodiments the infotainment module 22 can be integrated with other VSMs of the vehicle electronics 20, such as the audio system 56, the display 50, the telematics unit 30, etc. In at least some embodiments, the infotainment module 22 can use the cellular chipset 32 of the telematics unit 30 to request data from a remote server or facility (e.g., backed facility 80, remote computer 78) and receive data from the remote server or facility.

The infotainment unit 22 can include a SRWC circuit that enables SRWC functionality, such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit enables the infotainment unit 22 to transmit and receive SRWC signals, such as BLE signals. The SRWC circuit may allow the infotainment unit 22 to connect to another SRWC device.

Body control module (BCM) 24 can be used to control various VSMs of the vehicle as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM), the infotainment module 22, and/or integrated with telematics unit 30. Or, the BCM may be a separate device that is connected to other VSMs via bus 58. BCM 24 can include a processor and/or memory, which can be similar to processor 36 and memory 38 of telematics unit 30, as discussed below. BCM 24 may communicate with telematics unit 30 and/or one or more vehicle system modules, such as an HVAC system, various vehicle sensors, audio system 56, battery system 60, or other VSMs 28. Software stored in the memory and executable by the processor enables the BCM to direct one or more vehicle functions or operations including, for example, controlling central locking, detecting whether a vehicle door or compartment is opened, air conditioning (or other HVAC functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. The BCM 24 can also be used to determine or obtain diagnostic information concerning one or more VSMs of the vehicle, which can be in the form of diagnostic trouble codes (DTCs), for example.

Additionally, the BCM 24 may provide vehicle state information corresponding to the vehicle state or of certain vehicle components or systems, including the VSMs discussed herein. For example, the BCM 24 may provide the telematics unit 30 with information indicating whether the vehicle is in a primary propulsion on state or a primary propulsion off state, battery information from the battery system 60, sensor information (or other information) relating to vehicle theft detection, etc. The information can be sent to the telematics unit 30 (or other central vehicle computer) automatically upon receiving a request from the device/computer, automatically upon certain conditions being met, upon a request from another VSM, or periodically (e.g., at set time intervals). The BCM 24 can also be used to detect the presence of a predetermined vehicle operating condition, which can be carried out by (for example) comparing the predetermined vehicle operating condition (or information pertaining thereto) to current vehicle operating conditions (or present vehicle information). The BCM 24 can then wake-up or otherwise inform the telematics unit 30 of this event. In other embodiments, the telematics unit 30 can carry out this detecting function.

Engine control module (ECM) 26 may control various aspects of engine operation such as fuel ignition and ignition timing. The ECM 26 is connected to the communications bus 58 and may receive operation instructions (or vehicle commands) from the BCM 24 or other vehicle system modules, such as the telematics unit 30 or other VSMs 28. In one scenario, the ECM 26 may receive a command from the BCM to place the vehicle in a primary propulsion on state (from a primary propulsion off state)—i.e., initiate the vehicle ignition or other primary propulsion system (e.g., a battery powered motor). In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information). A primary propulsion off state refers to a state in which the primary propulsion system of the vehicle is off, such as when the internal combustion engine is not running or idling, when a vehicle key is not turned to a START or ON (or accessory) position, or when the power control system for one or more electric motors of an electric vehicle is powered off or not enabled. A primary propulsion on state is a state that is not a primary propulsion off state.

As mentioned above, in one embodiment, the vehicle 12 can include an internal combustion engine (ICE) and, in such cases, can be referred to as an ICE vehicle. These ICE vehicles can solely use an ICE for propulsion or may use a combination of another energy store (such as a traction battery) and the ICE. In the case of an ICE vehicle, the vehicle can include an engine control module (ECM) that controls various aspects of engine operation such as fuel ignition and ignition timing. The ECM can be connected to communications bus 58 and may receive operation instructions from BCM 24 or other vehicle system modules, such as telematics unit 30 or VSMs 28. In one scenario, the ECU may receive a command from the BCM to initiate the ICE. The ECM can also be used to obtain sensor information of the vehicle engine.

The vehicle 12 includes various onboard vehicle sensors and certain vehicle-user interfaces 50-54 can be utilized as onboard vehicle sensors. Generally, the sensors can obtain information pertaining to either the operating state of the vehicle (the "vehicle operating state") or the environment of the vehicle (the "vehicle environmental state"). The sensor information can be sent to other VSMs, such as BCM 24 and the telematics unit 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" or "vehicle operating conditions" refers to a state of the vehicle concerning the operation of the vehicle, which can include the operation of the primary mover (e.g., a vehicle engine, vehicle propulsion motors) and/or the operation of various VSMs or components of the vehicle. Additionally, the vehicle operating state (or conditions) can include the vehicle state pertaining to mechanical operations of the vehicle or electrical states of the vehicle (e.g., a state informed by sensor information indicating a vehicle door is opened). The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, vehicle location condition(s), and statuses of areas nearby the vehicle. A vehicle location condition refers to any condition pertaining to the location of (or associated with) the vehicle, such as traffic information surrounding the vehicle or along a planned route of the vehicle (i.e., "local traffic condition"), vehicle location classification(s), or vehicle movement activity.

The battery system 60 is included as a part of the vehicle electronics 20 and includes an electric battery 62, a battery state of charge (SoC) sensor 64, and a battery temperature sensor 66. The electric battery 62 is a battery that is used to power the vehicle electronics 20 (or at least a part thereof) and, in one embodiment, can be a 12V battery. In one embodiment, the vehicle can be an automobile and the electric battery 62 can be an automotive battery. The battery 62 is rechargeable and can be recharged by an alternator or other generator or power source. As mentioned above, the vehicle 12 can be an electric vehicle or a hybrid vehicle and, in such cases, the vehicle 12 can include an electric battery pack. In such embodiments where the vehicle 12 is a hybrid vehicle or an electric vehicle, the battery 62 can be a lower voltage battery (e.g., 12V) for powering various VSMs and other components of the vehicle electronics 20, which is separate from a traction battery or other battery that is used to power the primary propulsion system of the vehicle. However, in other embodiments, the electric battery 62 can be an electric battery pack, and can be a traction battery or an electric-vehicle battery that is used to provide propulsion for the vehicle 12 as well as to power the vehicle electronics 20 (or at least a part thereof). The electric battery 62 can be a lithium-ion battery, or may be a lead-acid battery. Other types of batteries could be used as appreciated by those skilled in the art.

The battery state of charge (SoC) sensor 64 is an onboard vehicle sensor and can be any of a variety of electrical components that can measure the state of charge of the electric battery 62. In one embodiment, the battery SoC sensor 64 can use (or can be) a voltage sensor, such as a dedicated voltmeter that is attached at a positive terminal of the battery 62 and at a negative terminal of the battery 62. In another embodiment, the battery SoC sensor 64 can use other techniques, such as chemical methodologies that can be used to measure the specific gravity of pH of the electrolytes contained within the battery 62, coulomb counting methodologies, Kalman filtering processes (e.g., using voltage and battery temperatures in a Kalman filtering process), pressure methodologies, or a combination thereof. The battery SoC sensor 64 can be configured in various ways, as appreciated by those skilled in the art. The battery SoC sensor 64 can provide sensor information to a computing device of the vehicle 12, such as the telematics unit 30, for purposes of determining a SoC level, which can be represented as a percentage of the full-charge capacity of the electric battery 62. The battery temperature sensor 66 can be a digital thermometer that is coupled to the electric battery 62 such that the battery temperature sensor 66 can measure a temperature of the electric battery 62. In one embodiment, the battery temperature sensor 66 can be used to obtain a SoC of the electric battery 62, or may be a part of the battery SoC sensor 64 and used in combination with other sensors, such as a voltmeter.

Additionally, the vehicle 12 can include other sensors not mentioned above, including cameras, wheel speed sensors, yaw rate sensors, orientation sensors (e.g., accelerometers), parking sensors, lane change and/or blind spot sensors, lane assist sensors, ranging sensors (i.e., sensors used to detect the range between the vehicle and another object, such as through use of radar or lidar), other radars, other lidars, tire-pressure sensors, fluid level sensors (e.g., a fuel or gas level sensor, a windshield wiper fluid level sensor), brake pad wear sensors, V2V communication unit (which may be integrated into the infotainment module 22 or telematics unit 30), rain or precipitation sensors (e.g., infrared light sensor(s) directed toward the windshield (or other window of the vehicle 12) to detect rain or other precipitation based on the amount of reflected light), and interior or exterior temperature sensors.

Telematics unit 30 is capable of communicating data via cellular network communications through use of a cellular chipset 32, as depicted in the illustrated embodiment. In one embodiment, the telematics unit 30 is a central vehicle computer that is used to carry out at least part of the method discussed below. In the illustrated embodiment, telematics unit 30 includes a cellular chipset 32, a GNSS receiver 34, a processor 36, memory 38, and antennas 33 and 35. The GNSS receiver 34 is integrated into the telematics unit 30 so that, for example, the GNSS receiver 34 and the telematics unit 30 are directly connected to one another as opposed to being connected via communications bus 58. However, in other embodiments, the GNSS receiver 34 (and/or GNSS antenna(s) 35) can be a standalone module or integrated with another VSM.

In one embodiment, the telematics unit 30 may be a standalone module or, in other embodiments, the telematics unit 30 may be incorporated or included as a part of one or more other vehicle system modules, such as a center stack module (CSM), the infotainment module 22, body control module (BCM) 24, a head unit, and/or a gateway module. In some embodiments, the telematics unit 30 can be implemented as an OEM-installed (embedded) or aftermarket device that is installed in the vehicle. In some embodiments, the telematics unit 30 can also include short-range wireless communications (SRWC) functionality, and can include a SRWC circuit.

As mentioned above, the telematics unit 30 includes a cellular chipset 34 thereby allowing the device to communicate via one or more cellular protocols, such as those used by cellular carrier system 70. In such a case, the telematics unit is user equipment (UE) that can attach to cellular carrier system 70 and carry out cellular communications, which can enable the vehicle electronics to connect to backend facility 80 and/or remote computer 78. The telematics unit 30 can include a subscriber identity module (SIM) that can be used for enabling cellular communications with the cellular carrier system 70.

The telematics unit 30 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the telematics unit 30 can be configured with a static IP address or can be set up to automatically receive an assigned IP address from another device on the network such as a router or from a network address server.

Packet-switched data communications may also be carried out via use of a cellular network that may be accessible by the telematics unit 30. The telematics unit 30 may, via cellular chipset 32, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 is included as a part of the telematics unit 30 and can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, processor 36 can execute programs or process data to carry out at least a part of the method discussed herein. Memory 38 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to the processor 36 and/or memory 38 can be included in infotainment unit 22, body control module 24, and/or various other VSMs that typically include such processing/storing capabilities.

The telematics unit 30 is connected to the bus 58, and can receive sensor data from one or more onboard vehicle sensors and, thereafter, the vehicle can send this data (or other data derived from or based on this data) to other devices or networks, including the vehicle backend services facility 80. And, in some embodiments, the telematics unit 30 can be incorporated with or at least connected to a navigation system that includes geographical map information including geographical roadway map data. The navigation system can be communicatively coupled to the GNSS receiver 34 (either directly or via communications bus 58) and can include an onboard geographical map database that stores local geographical map information. This local geographical map information (e.g., geographical roadway map data) can be provisioned in the vehicle and/or downloaded via a remote connection to a geographical map database/server, such as computer 78 and/or backend facility 80 (including servers 82 and databases 84). The onboard geographical map database can store geographical roadway map data corresponding to a location or region of the vehicle so as to not include a large amount of data, much of which may never be used. Moreover, as the vehicle 12 enters different locations or regions, the vehicle can inform the vehicle backend services facility 80 of the vehicle's location (e.g., obtained via use of GNSS receiver 34) and, in response to receiving the vehicle's new location, the servers 82 can query databases 84 (or computer 78) for the corresponding geographical map information, which can then be sent to the vehicle 12.

In the illustrated embodiment, the telematics unit 30 also includes a global navigation satellite system (GNSS) receiver 34. It should be appreciated that, in other embodiments, the GNSS receiver 34 can be included as a part of another VSM or a standalone VSM in the vehicle electronics 20. The GNSS receiver 34 receives radio signals from a constellation of GNSS satellites 68 using the GNSS antenna 35—although a single antenna 35 is discussed and illustrated, it should be appreciated that the GNSS receiver 34 can include any suitable number of antennas. GNSS receiver 34 can be configured to comply with and/or operate according to particular regulations or laws of a given geopolitical region (e.g., country). The GNSS receiver 34 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 34 may be a GPS receiver, which may receive GPS signals from a constellation of GPS satellites 68. And, in another example, GNSS receiver 34 can be a BDS receiver that receives a plurality of GNSS (or BDS) signals from a constellation of GNSS (or BDS) satellites 68. In one embodiment, the GNSS receiver 34 can include a processor and/or memory separate from that of processor 36 and memory 38.

In one embodiment, the GNSS receiver 34 may be used to provide navigation and other position-related services to the vehicle operator. Navigation information can be presented on the display 50 or can be presented verbally such as is done when supplying turn-by-turn navigation. The navigation services can be provided using a dedicated in-vehicle navigation module (which can be part of GNSS receiver 34 and/or incorporated as a part of telematics unit 30 or other VSM), or some or all navigation services can be done via the telematics unit 30 (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in the vehicle energy usage prediction application discussed below. Also, new or updated map data, such as that geographical roadway map data stored on databases 84, can be downloaded to the GNSS receiver 34 from the backend facility 80 (or computers 78) via telematics unit 30.

The GNSS receiver 34 can be set to a standby mode (or a low power mode) at least during times when the vehicle is in a primary propulsion off state. The standby mode can include a lower power mode and/or a mode in which the GNSS receiver 34 is turned off (i.e., supplied no electrical power) (in which case the GNSS receiver 34 can then be periodically woken up by other VSMs). In some embodiments, the vehicle electronics 20 can wake up the GNSS receiver 34 so that the GNSS receiver 34 receives GNSS signals and determines a GNSS location of the vehicle 12. After determining the GNSS location and/or performing other operations (e.g., storing the GNSS location to memory 38), the GNSS receiver 34 can turn off or otherwise be set to the standby mode. In some embodiments, when in standby mode, the GNSS receiver 34 can periodically wake-up and determine a GNSS location (and/or perform other operations). The periodicity of the GNSS receiver wake-up can be determined according to the method 200 (FIG. 2) and/or 300 (FIG. 3) below, which can be set to a period of time that is based on various vehicle conditions, such as vehicle location conditions and/or vehicle state conditions. This periodicity of determining the vehicle location (e.g., GNSS location) can be referred to as a vehicle location determination rate.

The telematics unit 30 can also be set to a standby mode in which the telematics functions of the telematics unit 30 are set to a standby or lower power mode. The telematics unit 30 can report the GNSS location in response to or as it is determined by the GNSS receiver 34. Or, in other embodiments, the telematics unit 30 can periodically report the current (or last determined) vehicle location (e.g., GNSS location) according to a vehicle location reporting rate, which can be different than the vehicle location determination rate (at least in one embodiment).

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information. The pushbutton(s) 52 allow manual user input into the vehicle electronics 20 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the infotainment unit 22 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other human-machine interfaces for providing input from a human to the vehicle as the interfaces of FIG. 1 are only an example of one particular implementation.

Figure 2:
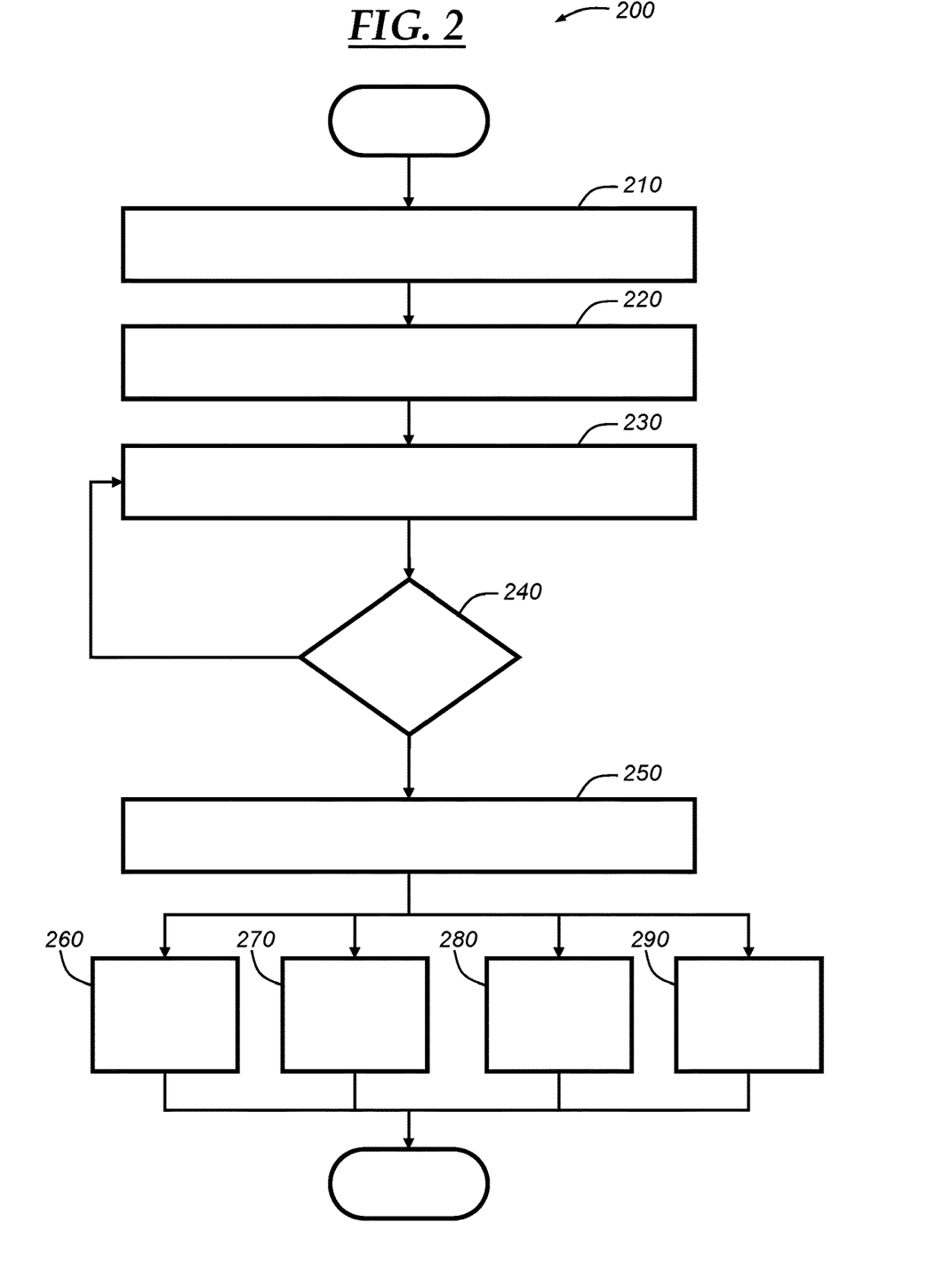
FIG. 2 is a flowchart of an embodiment of a method of tracking a location of a vehicle while the vehicle is in a primary propulsion off state.

With reference to FIG. 2, there is shown a method 200 of tracking a location of a vehicle while the vehicle is in a primary propulsion off state. In one embodiment, the method 200 (or any steps thereof) is carried out by the vehicle 12, such as by the telematics unit 30, other onboard vehicle computer or computer system, other VSMs, and/or other vehicle electronics. However, in another embodiment, one or more steps of the method 200 can be performed at another device, such as servers 82 and/or remote computer(s) 78. In such cases, the vehicle 12 can send information to the servers 82 or remote computer(s) 78, such as GNSS location information of the vehicle, vehicle operating conditions, vehicle location conditions, etc. Although the steps of the method 200 are described as being carried out in a particular order, it is hereby contemplated that the steps of the method 200 can be carried out in any suitable order as will be appreciated by those skilled in the art.

The method 200 begins with step 210, wherein an initial vehicle location is determined. In at least some embodiments, the initial vehicle location is a location that is a location (e.g., a GNSS location) of the vehicle when the vehicle transitions from a primary propulsion on state to the primary propulsion off state. The vehicle can detect this transition and then can use the GNSS receiver 34 to obtain the current vehicle location, or can use the last recorded/determined vehicle location as the initial vehicle location. The initial vehicle location can be determined using the GNSS receiver 34 by receiving a plurality of GNSS signals from a plurality of GNSS satellites 68. The GNSS location can be stored in memory 38 or other memory of the vehicle 12. In other embodiments, the initial vehicle location can be determined using other location determining mechanisms, such as through cellular triangulation.

In one embodiment, the initial vehicle location is determined in response to detecting that the transitioned from the primary propulsion on state to the primary propulsion off state. For example, when the vehicle's ignition is powered off, the vehicle can use the GNSS receiver 34 to determine the vehicle location and store the location to memory. In another embodiment, a different trigger, such as when a vehicle user opens a door, can be used for determining when to obtain or determine the initial vehicle location. This trigger can be referred to as the initial vehicle location trigger. In another embodiment, the initial vehicle location can be periodically updated while the vehicle is in a primary propulsion on state and saved to memory. The last updated vehicle location can then be used as to the initial vehicle location.

In some embodiments, after the initial vehicle location is determined, the initial vehicle location can be reported (or otherwise sent) to a remote server, such as servers 82 at backed facility 80 and/or computer(s) 78 via cellular carrier system 70 and/or land network 76. In one embodiment, the initial vehicle location can be sent using the cellular chipset 32 of the telematics unit 30 to the servers 82, which can then store the vehicle's location. In some embodiments, while the vehicle is in a primary propulsion on state, the telematics unit 30 maintains a connection (or call) with a remote server. This connection or call may be terminated when the vehicle transitions from the primary propulsion on state to the primary propulsion off state. However, in one embodiment, when the vehicle detects the initial vehicle location trigger, the telematics unit 30 can maintain the connection so that the initial vehicle location can be determined (or otherwise obtained) and then sent to the remote server. The method 200 continues to step 220.

In step 220, a vehicle trigger condition is detected while the vehicle is in the primary propulsion off state. The vehicle trigger condition is separate from the initial vehicle location trigger, but can be detected based on similar or the same vehicle operating states or conditions. The vehicle trigger condition can be detected by monitoring activity on the bus 58 and/or by receiving certain sensor information from one or more onboard vehicle sensors. For example, the vehicle electronics 20 may determine that a vehicle door has been opened, which can act as the vehicle trigger condition. In some embodiments, the vehicle trigger condition can be a theft trigger condition, which is a condition that indicates the vehicle is being stolen, broken into, and/or tampered with. Those skilled in the art will appreciate the various mechanisms for determining whether a theft trigger condition exists, such as through using anti-theft vehicle systems. As one example, the vehicle can detect that the vehicle 12 is oriented at an angle greater than a predetermined inclination angle, which may indicate that the vehicle is being towed. In another example, the theft trigger condition can include detecting a window breaking or detecting motion in the vehicle, such as through using a camera. Once the vehicle trigger condition is detected, the method 200 continues to step 230.

In step 230, the location of the vehicle is periodically monitored. This can include determining the GNSS location of the vehicle periodically and then determining (in step 240) whether the vehicle has moved more than a first predetermined threshold distance. In another embodiment, other vehicle onboard sensors can be used to determine movement of the vehicle, such as an accelerometer. Once movement is detected, a new vehicle location can be determined. This new location can be the GNSS location determined during the monitoring (if the monitoring uses the GNSS location) or can be obtained using the GNSS receiver 34 after detecting movement. In either case, the vehicle location can be determined using the GNSS receiver 34 by receiving a plurality of GNSS signals from a plurality of GNSS satellites 68. The new vehicle location can then be stored in memory 38 of the telematics unit 30 or other memory of the vehicle electronics 20. In one embodiment, at this time, the telematics unit 30 can send the new vehicle location to a remote monitoring server, which can be a remote server (or collection of servers) that monitor the vehicle's location and/or that monitors the vehicle for purposes of anti-theft. In other embodiments, the new vehicle location is not sent to the remote server at this time, but stored in memory. The method 200 continues to step 240.

In step 240, it is determined whether the vehicle has moved more than a first predetermined threshold distance. In at least some embodiments, this determination can be made by comparing the initial vehicle location with the new vehicle location. And, in at least some embodiments, it can be determined whether the vehicle has moved more than a first predetermined threshold distance since the vehicle last transitioned from the primary propulsion on state to the primary propulsion off state. Although the initial vehicle location and the new vehicle location can be used to make this determination, other information can also be used or may be used in lieu of this information, at least in one embodiment. The first predetermined threshold distance can be a preselected distance that is stored in memory of the vehicle electronics 20, or may be a distance that is determined at a time when the vehicle transitions from the primary propulsion on state to the primary propulsion off state. In one embodiment, the first predetermined threshold distance is determined based on a vehicle activity factor and a vehicle location classification factor, which may be determined initially when the vehicle transitions from the primary propulsion on state to the primary propulsion off state. The method 200 continues to step 250 when it is determined that the vehicle has moved more than the first predetermined threshold distance. Otherwise, the method 200 continues back to step 220.

Figure 3:
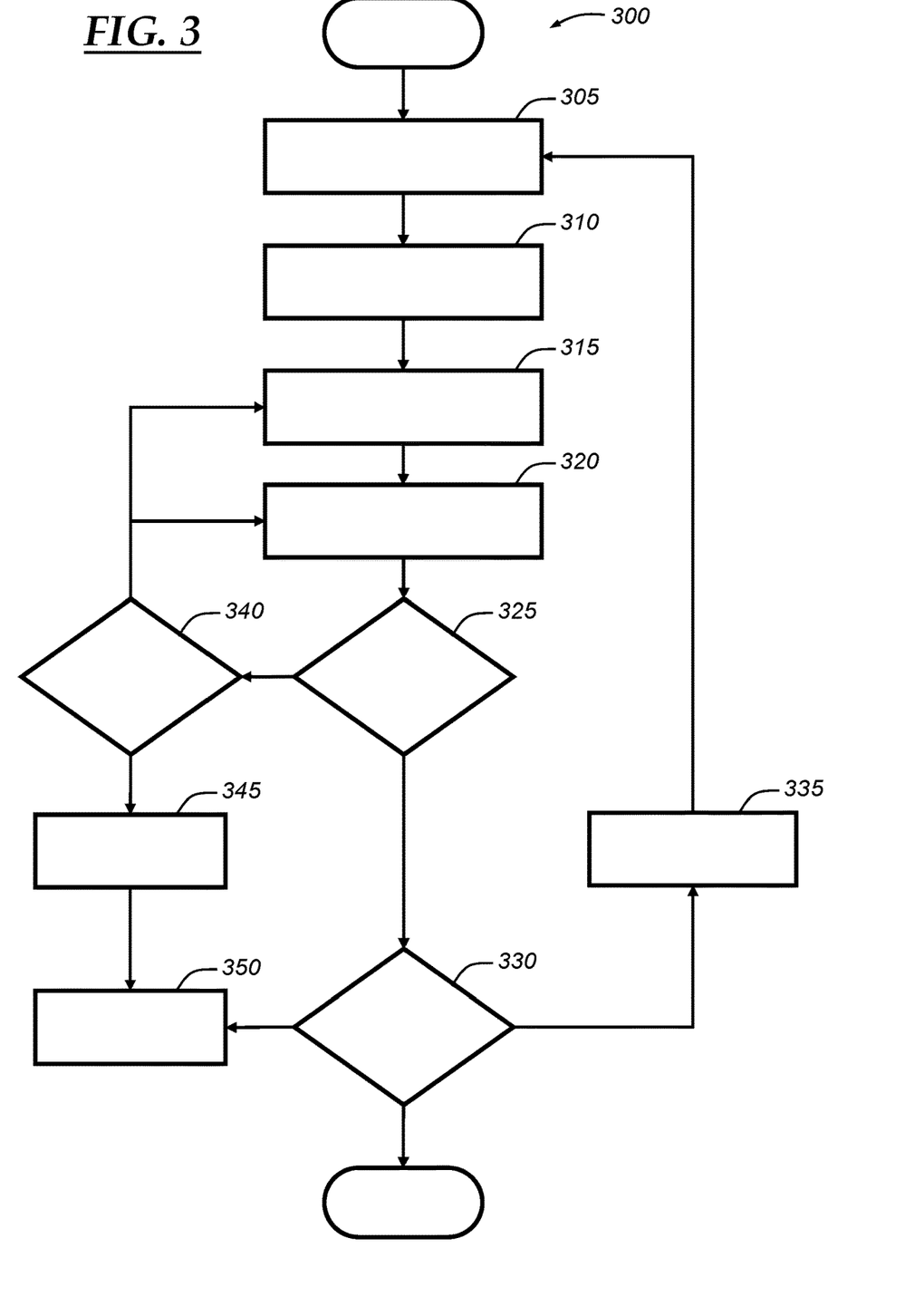
FIG. 3 is a flowchart of an embodiment of a vehicle location tracking process that can be carried out along with or as a part of the method of FIG. 2.

In step 250, vehicle location tracking process parameters are selected. A vehicle location tracking process is a process in which the location of the vehicle is periodically tracked and, in many embodiments, is carried out while the vehicle is in the primary propulsion off state. The vehicle location tracking process parameters are parameters that are selected for use in the vehicle location tracking process. An embodiment of a vehicle location tracking process is described below in the method 300 (FIG. 3). The vehicle location tracking process can use one or more vehicle location tracking process parameters in carrying out the process. The vehicle location tracking process parameters can include the vehicle location determination rate and/or the vehicle location reporting rate.

The vehicle location tracking process parameters can be selected based on a vehicle activity factor, a vehicle location classification factor, a traffic factor, and/or vehicle operating conditions. The vehicle activity factor describes or represents an amount of vehicle movement and can be determined based on the rate of movement of the vehicle. For example, when the vehicle travels more than a high-activity threshold amount in a given time period, then the vehicle activity factor can be set to "high-activity." And, when the vehicle travels less than the high-activity threshold amount in a given time period, then the vehicle activity factor can be set to "low-activity." The vehicle location classification factor describes or represents a type (or classification) of the vehicle location. Different kinds of classification can be used; for example, the vehicle location classification factor can be set to "city" when it is determined that the vehicle location (e.g., the initial vehicle location, the new vehicle location) is within a city (or urban area), and the vehicle location classification factor can be set to "rural" when it is determined that the vehicle location is within a rural area.

The vehicle location tracking process parameters can also be selected based on a traffic factor, which describes or represents traffic in the area surrounding and/or containing the vehicle location. The traffic factor can be set to "heavy" when there is heavy or a high amount of traffic in the area surrounding the vehicle, and the traffic factor can be set to "light" when there is light traffic or a low amount of traffic in the area surrounding the vehicle. The vehicle location tracking process parameters can also be selected based on vehicle operating conditions. The vehicle operating conditions can be represented by any vehicle operating state, which can be determined through use of one or more VSMs, including one or more onboard vehicle sensors. For example, the amount and/or type of activity detected on the communications bus 58, the detection that a vehicle door (or compartment) is opened or is being opened, the heading of the vehicle, the orientation of the vehicle, and/or various other vehicle operating state information can be used in determining one or more vehicle location tracking process parameters.

As a first example, when the vehicle activity factor is set to "high-activity" and the vehicle location classification factor is set to "city," the vehicle location tracking process parameters can be selected to include a high vehicle location determination rate and/or a high vehicle location reporting rate. And, as a second example, when the vehicle activity factor is set to "low-activity" and the vehicle location classification factor is set to "rural," the vehicle location tracking process parameters can be selected to include a low vehicle location determination rate and/or a low vehicle location reporting rate. In a third example, when the vehicle activity factor is set to "high-activity" and the vehicle location classification factor is set to "rural," the vehicle location tracking process parameters can be selected to include a vehicle location determination rate and/or a vehicle location reporting rate that is higher than the rates in the second example, but lower than the rates in the first example. Thus, at least in one embodiment, when the vehicle activity factor is set to "high-activity," the vehicle location determination rate and/or a vehicle location reporting rate is higher than when vehicle activity factor is set to "low-activity." And, at least in one embodiment, when vehicle location classification factor is set to "city," the vehicle location determination rate and/or a vehicle location reporting rate is higher than when vehicle location classification factor is set to "rural." Also, when there is heavy traffic (as indicated by the traffic factor), the vehicle location determination rate and/or a vehicle location reporting rate can be reduced as compared to times when there is light traffic. And, also, the vehicle location tracking process parameters can be based on certain vehicle operating conditions. For example, when the state of charge (SoC) of the battery 62 is low (as measured by SoC sensor 64), the vehicle location determination rate and/or a vehicle location reporting rate can be reduced. Also, certain vehicle operating conditions (e.g., sensor information from one or more onboard vehicle sensors) can be used to trigger determining the vehicle location (e.g., using GNSS receiver 34) and/or reporting the vehicle location in response to that trigger.

In some embodiments, any one or more of the vehicle location tracking process factors can be determined based on information obtained from a remote server. For example, traffic information of the area surrounding the vehicle can be obtained from a remote server that provides roadway traffic information, and this traffic information can be used to determine the traffic factor. And, in another embodiment, the vehicle location classification factor can be determined based on roadway information or other information that can be used to determine or predict whether the vehicle is located in a city or a rural area. For example, the density of roadways in a given area or businesses in a given area can be used to make a determination of the vehicle location classification factor. This information obtained from the remote server can obtained prior to or at the time of the vehicle transitioning from the primary propulsion on state to the primary propulsion off state. In one embodiment, the telematics unit 30 can be used to retrieve this information and, in one embodiment, this information can be retrieved using the connection that is established in step 310 of the method 300 (FIG. 3). In such an embodiment, the vehicle location tracking process parameters can then be selected or adjusted at that time.

In some embodiments, any one or more of the vehicle location tracking process factors can be determined based on information obtained from one or more VSMs of the vehicle, such as one or more onboard vehicle sensors. For example, the vehicle activity factor can be determined based on GNSS information (e.g., vehicle location information) obtained from the GNSS receiver 34, and/or can be determined based on a wheel speed sensor at a time prior to the vehicle transitioning from the primary propulsion on state to the primary propulsion off state. The method 200 continues to one of steps 260-290.

In steps 260-290, the vehicle location tracking process is carried out using the vehicle location tracking process parameter(s) selected in step 250. Step 260 is a low-activity, city tracking process, which is the vehicle location tracking process that includes vehicle location tracking process parameter(s) selected for use when the vehicle activity factor is set to low-activity and when the vehicle location classification factor is set to "city." Step 270 is a high activity, city tracking process, which is the vehicle location tracking process that includes vehicle location tracking process parameter(s) selected for use when the vehicle activity factor is set to high-activity and when the vehicle location classification factor is set to "city." Step 280 is a low-activity, rural tracking process, which is the vehicle location tracking process that includes vehicle location tracking process parameter(s) selected for use when the vehicle activity factor is set to low-activity and when the vehicle location classification factor is set to "rural." Step 290 is a high activity, rural tracking process, which is the vehicle location tracking process that includes vehicle location tracking process parameter(s) selected for use when the vehicle activity factor is set to high-activity and when the vehicle location classification factor is set to "rural." At least in one embodiment, the vehicle location tracking process can be the same for all of these four different scenarios, but may use different parameter values or options according to those vehicle location tracking process parameter(s) selected in step 250. For example, in one embodiment, the process of step 260 can use the highest vehicle location determination rate and/or the highest vehicle location reporting rate, with the process of step 270 being next, then the process of step 280, and finally the process of step 290 having the lowest vehicle location determination rate and/or the lowest vehicle location reporting rate.

In another embodiment, instead of selecting vehicle location tracking process parameter(s) in step 250, a vehicle location tracking process can be selected based on the vehicle location tracking process factors, which includes on a vehicle activity factor, a vehicle location classification factor, a traffic factor, and/or vehicle operating conditions, for example. These processes can thus be embodied in a separate computer program and/or may comprise a different set of steps. In any of these embodiments, the method includes carrying out the vehicle location tracking process, an example of which will be described below in the method 300 (FIG. 3). The method 200 then ends.

With reference to FIG. 3, there is shown a vehicle location tracking process 300 that includes steps 305-350. The process 300 can be carried out by the vehicle electronics 20, may be carried out by one or more remote servers (e.g., server(s) 82 of the backend facility 80 and/or computer 78), or a combination thereof. In one embodiment, the process 300 is carried out as a part of the method 200 at any one or more of steps 260-290. The process 300 can be used to track the location of the vehicle while the vehicle is in a primary propulsion off state. Although the steps of the process 300 are described as being carried out in a particular order, it is hereby contemplated that the steps of the process 300 can be carried out in any suitable order as will be appreciated by those skilled in the art.

The method 300 begins with step 305, wherein the telematics unit and/or the GNSS receiver are woken up or turned on by the vehicle electronics. In one embodiment, the telematics unit 30 is set to a low-power or standby mode when the vehicle transitions from the primary propulsion on state to the primary propulsion off state. The low-power or standby mode will collectively be referred to as the standby mode. In another embodiment, the telematics unit 30 is turned off when the vehicle transitions from the primary propulsion on state to the primary propulsion off state. Thus, when the telematics unit is woken up (or command to wake up), the telematics unit 30 turns on or enters a state in which cellular communications can be (or are enabled to be) carried out. The state of the telematics unit prior to being woken up can be an off state or a standby mode/state.

In one embodiment, the GNSS receiver 34 is set to a standby mode when the vehicle transitions from the primary propulsion on state to the primary propulsion off state. And, in another embodiment, the GNSS receiver 34 is turned off when the vehicle transitions from the primary propulsion on state to the primary propulsion off state. Thus, when the GNSS receiver is woken up (or command to wake up), the GNSS receiver turns on or enters a state in which a GNSS location of the vehicle can be determined, such as based on receiving a plurality of GNSS signals from a plurality of GNSS satellites. The state of the GNSS receiver prior to being woken up can be off or in a standby mode. In an embodiment where only the GNSS receiver 34 is woken up, the telematics unit 30 can already be in a wake (or active) state. In one embodiment, both the telematics unit 30 and/or the GNSS receiver 34 are woken up.

In one embodiment, the telematics unit 30 and/or the GNSS receiver 34 are woken up by another VSM, which can be accomplished by sending a wake-up command via the communications bus 58, for example. In another embodiment, the telematics unit 30 (and/or the GNSS receiver 34) can be programmed to periodically wake up after a predetermined amount of time, which (in one embodiment) can correspond to the vehicle location determination rate and/or a low vehicle location reporting rate. The method 300 continues to step 310.

In step 310, a connection is initiated to a remote server. The remote server can be any server that is remote to the vehicle 12, such as server(s) 82 at the backend facility 80 or the computer 78. The connection can be a cellular call or may be a data connection that is established with the remote server. In one embodiment, a call to the remote server is initiated and then established. The connection (e.g., the call) can be held for a predetermined amount of time, which can be referred to as a predetermined call hold time. This predetermined call hold time can be stored in memory of the vehicle electronics 20, and/or can be selected based on certain vehicle operating conditions and/or the vehicle location tracking process factors. For example, the predetermined call hold time can be selected based on the SoC of the battery 62. The method 300 continues to step 315.

In step 315, an updated vehicle location is determined. In at least some embodiments, the updated vehicle location is determined by using the GNSS receiver 34, which receives a plurality of GNSS signals from a plurality of GNSS satellites 68. The updated GNSS location (or other vehicle location) can be stored in memory 38 of the telematics unit 30, or in another memory of the vehicle electronics 20. The method then continues to step 320.

In step 320, the updated vehicle location is reported to the remote server. The updated vehicle location is reported via the connection that was initiated in step 310. The updated vehicle location can be sent via this connection, which can be a cellular data connection or a cellular call. In at least some embodiments, the updated vehicle location is sent using the cellular chipset 32 of the telematics unit 30. The telematics unit 30 can automatically send the updated vehicle location to the remote server, or a request for an update vehicle location from the remote server. The method 300 then continues to step 325.

In step 325, it is determined whether the vehicle location was updated (i.e., whether an updated vehicle location was determined and/or received at the remote server). This step can be carried out by the remote server, and can include determining whether a vehicle location was received from the vehicle 12 via the connection. Additionally or alternatively, this step can be carried out by the vehicle electronics (e.g., the telematics unit 30), and can include determining whether a vehicle location was determined and successfully sent and/or received at the remote server. When the updated vehicle location is successfully sent to the remote server, the telematics unit 30 and/or GNSS receiver can re-enter the standby mode (or off mode); however, in some embodiments, the telematics unit 30 may be carrying out other steps of the method 300 and may not enter the standby mode (or off mode) until step 335. When it is determined whether the vehicle location was updated, the method 300 proceeds to step 330.

In some embodiments, the reporting of the updated vehicle location in step 320 may not be successful and, if it is not, the method 300 can continue to step 340. In step 340, it is determined whether the reporting of the vehicle location should be retried. The retry process can be carried out until the number of attempts reaches a predetermined value, which can be referred to as a predetermined number of retry attempts. When the predetermined number of retry attempts has not yet been reached, the method 300 continues back to step 315 (to try to obtain an updated vehicle location) and/or 320 (to reattempt at sending the updated vehicle location). Otherwise, the method 300 continues to step 345, where an update vehicle location failure notification is sent to the remote server (or stored at the remote server) and/or the vehicle electronics. The method 300 then continues from step 345 to step 350, which will be described in more detail below.

In step 330, it is determined whether vehicle location tracking process parameters should be updated, or whether a new vehicle location tracking process should be selected. In one embodiment, this step can include reassessing the vehicle location tracking process factors discussed above in step 250 of the method 200 (FIG. 2). As discussed below, the method 400 provides one example of determining whether vehicle location tracking process parameters should be updated, or whether a new vehicle location tracking process should be selected.

Figure 4:
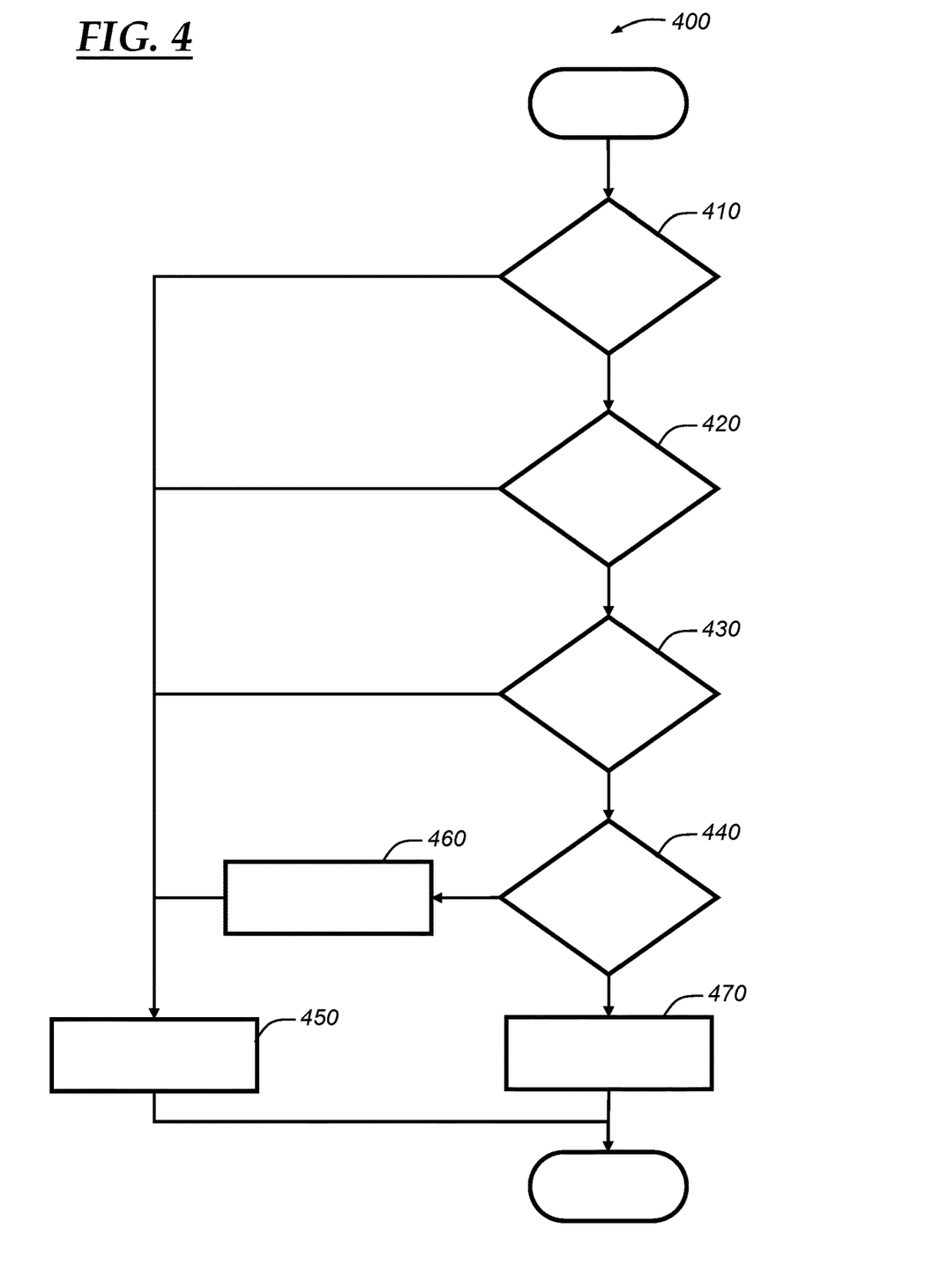
FIG. 4 is a flowchart of an embodiment of a process that can be used to determine whether vehicle location tracking process parameters should be updated, or whether a new vehicle location tracking process should be selected.

With reference to FIG. 4, there is shown a process that can be used to determine whether vehicle location tracking process parameters should be updated, or whether a new vehicle location tracking process should be selected. This process 400 can be carried out by the vehicle 12 (e.g., telematics unit 30) and/or the remote server. This process 400 assumes that the current vehicle location tracking process is (or the parameters used for the vehicle location tracking process are for) a high-activity, city vehicle location tracking process, which can be used when the vehicle is moving at a fast rate or has moved more than a predetermined distance since previously checked. As shown in step 410, it can be determined whether there is high traffic in the surrounding area and, if so the method 400 continues to step 420; otherwise, the method 400 continues to step 450. In step 420, it is determined whether the location was changed, which can include determining whether the updated vehicle location is the same as the previous updated vehicle location and, if so, then the method 400 continues to step 430; otherwise, the method 40 continues to step 450.

In step 430, it is determined whether the change in location is greater than the first predetermined threshold distance, which can be the same as that used in step 240 (FIG. 2). If so, the method 400 continues to step 440; otherwise, the method 400 continues to step 440. In step 440, it is determined whether the change in location is greater than a second predetermined threshold distance—this second predetermined threshold distance can be greater than the first predetermined threshold distance and can be referred to as a high-activity predetermined threshold distance, which means that, when the change in location exceeds this high-activity predetermined threshold distance, the activity factor is set to "high-activity." In steps 430 and/or 440, the change in location can be measured as a distance between the updated vehicle location and a previous vehicle location, which can be an updated vehicle location from a previous iteration of the method 300. The distance used to represent the change in location can be calculated based on a route distance or a linear distance, for example. The method 400 continues to step 470 when it is determined that the change in location is greater than the second predetermined threshold distance; otherwise, the method 400 continues to step 460. In step 460, it is determined to use a low-activity, city vehicle location tracking process. This can be stored as an indicator and/or the method can proceed back to the method 300 but modified to use vehicle location tracking parameters that are tailored to the instances when the vehicle is experiencing low-activity and is located in a city area.

In step 450, it is determined that the vehicle location tracking process parameters should be updated, or that a new vehicle location tracking process should be selected. In step 470, it is determined that the vehicle location tracking process parameters are not to be updated, or that the current vehicle location tracking process can be continued. With reference back to FIG. 3, when step 450 is reached in the method 400, the method 300 continues to step 350 and, when step 470 is reached in the method 400, the method 300 continues to step 335. In step 350, vehicle location tracking process parameters are updated, or a new vehicle location tracking process is selected. This step can correspond to step 250 of the method 200 and can be carried out in a like fashion. In step 335, the method 300 waits for a predetermined amount of time before restarting another iteration of the method 300. This predetermined waiting time can correspond to vehicle location iteration interval, which can be an amount of time to wait before beginning the method 300 again, which can be measured from the end of the method 300, from the start of the method 300, or from a particular step of the method 300, such as step 315 or 320. At step 335, the telematics unit 30 and/or the GNSS receiver 34 can be set to a standby mode or turned off so as to save battery power. In one embodiment, the vehicle location iteration interval can be the vehicle location determination rate and/or the vehicle location reporting rate. For example, at least in one embodiment, the vehicle location determination rate can specify a rate in which the process 300 should be carried out so as to obtain a new or updated vehicle location. And, at least in one embodiment, the vehicle location reporting rate can specify a rate in which the process 300 should be carried out so as to report an updated vehicle location. In the case where the vehicle location determination rate is the same as the vehicle location reporting rate (or where they are both carried out at the same rate), then the method 300 can use this rate to set the predetermined waiting time.

In other embodiments, the method 300 can use both a vehicle location determination rate and the vehicle location reporting rate. The steps that correspond to determining a vehicle location (e.g., step 315) can then be carried out according to the vehicle location determination rate. And, the steps that correspond to reporting a vehicle location (e.g., steps 310, 320) can then be carried out according to the vehicle location reporting rate. The determination process and the reporting process can thus be a part of separate processes, for example. Step 305 may be carried out for either or both of the determination process and the reporting process, according to whether the GNSS receiver 34 and/or the telematics unit 30 needs to be or desirably is to be woken up. The other steps can be incorporated into either or both of these processes, as will be appreciated by those skilled in the art. As an example, the vehicle location can be determined at a rate R and stored in memory, but the vehicle locations can be reported (e.g., sent to backend facility 80) at a rate R/4, so that 4 vehicle locations (and their time indicators, for example) can be sent in a single reporting message from the telematics unit 30 to the remote server. This saves data usage and battery as the cellular transmissions are reduced.

In one embodiment, the method 300 can be continuously carried out until the battery 62 of the vehicle runs out, until a message is received from the remote server instructing the telematics unit 30 (or other vehicle electronics 20 carrying out the method) to stop the method 300, or until an indication is received to stop the method 300. In one embodiment, the vehicle may be started or otherwise placed from the primary propulsion off state into the primary propulsion on state, and this can be used as an indication to end or stop the method 300.

In one embodiment, in addition to determining and/or reporting the updated vehicle location according to the vehicle location determination rate and/or the vehicle location reporting rate, the vehicle location can be determined (e.g., step 315) and/or reported (e.g., step 310, 320) in response to detecting certain (or predetermined) vehicle operating parameters. For example, when it is detected (using onboard vehicle sensors) that a vehicle door has been opened, the vehicle location can be determined and stored in memory of the vehicle. Also, at this time, or a later time, this vehicle location can be reported to the remote server. Moreover, when certain predetermined vehicle operating conditions are detected (e.g., detection of a door opening), the vehicle location determination rate and/or the vehicle location reporting rate (or the vehicle location iteration interval) can be increased or decreased. In many embodiments, any one or more of the vehicle locations can be associated with a time indicator (e.g., timestamp), which can be used to detect the vehicle location at a particular time and/or to detect a rate of movement (e.g., vehicle activity factor) of the vehicle.

In one embodiment, the method 200 and/or parts thereof (e.g., process 300, process 400) can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory at servers 82, memory of the vehicle 12 (e.g., memory 38), a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

What is claimed is:

1. A method of tracking a location of a vehicle while the vehicle is in a primary propulsion off state, wherein the method comprises the steps of:
    obtaining an initial vehicle location of the vehicle, wherein the initial vehicle location is associated with a time in which the vehicle transitions from a primary propulsion on state to a primary propulsion off state;
    detecting a vehicle trigger condition while the vehicle is in the primary propulsion off state;
    determining whether the vehicle has moved more than a first predetermined threshold distance from the initial vehicle location while the vehicle is in the primary propulsion off state;
    determining a vehicle activity factor and a vehicle location classification factor; and
    when it is determined that the vehicle has moved more than the first predetermined threshold distance from the initial vehicle location, carrying out a vehicle location tracking process while the vehicle is in the primary propulsion off state based on the vehicle activity factor and the vehicle location classification factor.

2. The method of claim 1, wherein the vehicle trigger condition is a theft trigger condition, wherein the theft trigger condition is a condition that indicates the vehicle is being stolen, broken into, and/or tampered with.

3. The method of claim 2, wherein the method further comprises the step of, in response to detecting the vehicle trigger condition, monitoring the vehicle location until it is determined that the vehicle has moved more than the first predetermined threshold distance from the initial vehicle location, at which time the vehicle location tracking process is carried out.

4. The method of claim 1, wherein the method further comprises the step of determining one or more vehicle location tracking process parameters, wherein the vehicle location tracking process is carried out based on the one or more vehicle location tracking process parameters.

5. The method of claim 4, wherein the one or more vehicle location tracking process parameters include a vehicle location determination rate and/or a vehicle location reporting rate.

6. The method of claim 5, wherein the vehicle activity factor represents a rate of movement of the vehicle based on two or more vehicle locations, each of which is associated with a time indicator.

7. The method of claim 6, wherein the one or more vehicle location tracking process parameters are based on the vehicle activity factor and the vehicle location classification factor.

8. The method of claim 4, wherein the one or more vehicle location tracking process parameters include a predetermined waiting time, and wherein the vehicle location tracking process pauses or waits for the predetermined waiting time between iterations.

9. The method of claim 1, wherein the method is carried out by a telematics unit of the vehicle, and wherein the telematics unit is woken up as a part of each iteration of the vehicle location tracking process.

10. The method of claim 9, wherein the vehicle location tracking process includes periodically determining and reporting an updated vehicle location to a remote server.

11. The method of claim 10, wherein the method further comprises the step of initiating a connection between the vehicle and a remote server using the telematics unit, and wherein the updated vehicle location is periodically reported to the remote server.

12. The method of claim 11, wherein the updated vehicle location is periodically reported to the remote server according to a vehicle location reporting rate, and wherein the vehicle location reporting rate is determined based on the vehicle activity factor and the vehicle location classification factor.

13. A method of tracking a location of a vehicle while the vehicle is in a primary propulsion off state, wherein the method comprises the steps of:
   detecting a vehicle trigger condition while the vehicle is in the primary propulsion off state;
   determining one or more vehicle location tracking process parameters based on one or more vehicle location tracking process factors; and
   carrying out a vehicle location tracking process based on the one or more vehicle location tracking process parameters, wherein the vehicle location tracking process is carried out while the vehicle is in the primary propulsion off state, and wherein the vehicle location tracking process includes:
      waking up a telematics unit of the vehicle;
      after waking up the telematics unit, establishing a remote connection with a remote server using the telematics unit;
      determining an updated vehicle location;
      reporting the updated vehicle location using the connection; and
      repeating the vehicle location tracking process according to a vehicle location iteration interval, wherein the vehicle location iteration interval is based at least on one of the vehicle location tracking process parameters.

14. The method of claim 13, wherein the vehicle location iteration interval represents a predetermined wait time in which the vehicle location tracking process waits until carrying out a next iteration.

15. The method of claim 13, wherein the telematics unit includes a global navigation satellite system (GNSS) receiver, and wherein the GNSS receiver is used to determine the updated vehicle location.

16. The method of claim 13, wherein the one or more vehicle location tracking process factors are monitored during the carrying out of the vehicle location tracking process, and wherein the method further comprises the step of, when it is determined that the one or more vehicle location tracking process parameters have changed, selecting a new vehicle location tracking process or carrying out the vehicle location tracking process using updated vehicle location tracking process parameters.

17. The method of claim 16, wherein the one or more vehicle location tracking process factors include a vehicle activity factor, a vehicle location classification factor, and a traffic factor.

18. The method of claim 13, wherein the method further comprises the step of obtaining an initial vehicle location, wherein the initial vehicle location is associated with a time in which the vehicle transitions from a primary propulsion on state to the primary propulsion off state.

19. The method of claim 18, wherein the method further comprises the step of determining whether the vehicle has moved more than a first predetermined threshold distance from the initial vehicle location while the vehicle is in the primary propulsion off state and, when it is determined that the vehicle has moved more than a first predetermined threshold distance from the initial vehicle location, carrying out the vehicle location tracking process.

20. The method of claim 13, wherein the vehicle location tracking process further includes detecting a predetermined vehicle operating condition based on receiving onboard sensor information, and, in response to detecting the predetermined vehicle operating condition, determining the updated vehicle location and/or reporting the updated vehicle location.

* * * * *